United States Patent
Bonaccorso

(10) Patent No.: US 10,729,282 B2
(45) Date of Patent: Aug. 4, 2020

(54) APPARATUS FOR PREPARING FOOD AND COMPRISING AN AIR COOLING SYSTEM

(71) Applicant: KONINKLIJKE PHILIPS N.V., Eindhoven (NL)

(72) Inventor: Davide Bonaccorso, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 298 days.

(21) Appl. No.: 15/736,527

(22) PCT Filed: Jun. 20, 2016

(86) PCT No.: PCT/EP2016/064140
§ 371 (c)(1),
(2) Date: Dec. 14, 2017

(87) PCT Pub. No.: WO2017/001221
PCT Pub. Date: Jan. 5, 2017

(65) Prior Publication Data
US 2018/0177334 A1    Jun. 28, 2018

(30) Foreign Application Priority Data

Jun. 29, 2015 (EP) ..................................... 15174262

(51) Int. Cl.
*A47J 37/07* (2006.01)
(52) U.S. Cl.
CPC ................. *A47J 37/0754* (2013.01)
(58) Field of Classification Search
CPC .... A47J 37/07; A47J 37/0754; A47J 37/0641; A47J 39/003

(Continued)

(56) References Cited

U.S. PATENT DOCUMENTS 4,561,348 A * 12/1985 Halters ................. F24C 15/322
126/21 A
5,029,519 A * 7/1991 Boyen ..................... A47J 36/38
126/21 A (Continued)

FOREIGN PATENT DOCUMENTS

CN       202136205        2/2012
CN       203828752 U      9/2014

(Continued)

*Primary Examiner* — Christopher M Koehler

(57) ABSTRACT

The present application relates to an apparatus (1) for preparing food. The apparatus (1) comprises a housing (2), and a food preparation chamber (3) arranged in the housing (2) and having an outer wall (3A). The apparatus (1) further comprises an air cooling system comprising a fan (4), a first air inlet (5A, 5B) arranged at an upper part of the housing (2), a second air inlet (6A, 6B) arranged at a lower part of the housing (2), and an air outlet (7). A first air channel (C1) is formed between said housing (2) and said outer wall (3 A) for fluidly connecting said first air inlet (5A, 5B) and said fan (4). A second air channel (C2) is formed between said housing (2) and said outer wall (3A) for fluidly connecting said second air inlet (6A, 6B) and said fan (4). A third air channel (C3) fluidly connects said fan (4) and said air outlet (7). The fan (4) is arranged to convey air through said first air channel (C1) between said first air inlet (5 A, 5B) and said fan (4), to convey air through said second air channel (C2) between said second air inlet (6A, 6B) and said fan (4), and to convey air through said third air channel (C3) between said fan (4) and said air outlet (7). The third air channel (C3) is arranged such that air passing through said third air channel (C3) is directed onto said outer wall (3 A) of the food preparation chamber (3) before being vented from said air outlet (7).

20 Claims, 3 Drawing Sheets

(58) Field of Classification Search
USPC .......................................... 99/330, 447, 483
See application file for complete search history.

(56) References Cited

U.S. PATENT DOCUMENTS

| | | | | |
|---|---|---|---|---|
| 5,361,686 A | * | 11/1994 | Koopman | A47J 37/042 |
| | | | | 126/21 A |
| 5,451,744 A | * | 9/1995 | Koopman | A47J 37/042 |
| | | | | 219/400 |
| 5,588,353 A | * | 12/1996 | Glucksman | A21B 7/005 |
| | | | | 99/348 |
| 5,699,722 A | | 12/1997 | Erickson | |
| 6,658,995 B1 | * | 12/2003 | DeYoung | A21C 13/00 |
| | | | | 165/267 |
| 2015/0164271 A1 | | 6/2015 | McKee | |
| 2017/0000293 A1 | * | 1/2017 | Sladecek | A47J 37/0641 |

FOREIGN PATENT DOCUMENTS

| | | |
|---|---|---|
| JP | H10127487 | 5/1998 |
| KR | 101253705 B1 | 4/2013 |
| WO | 2014044038 A1 | 3/2014 |

\* cited by examiner

APPARATUS FOR PREPARING FOOD AND COMPRISING AN AIR COOLING SYSTEM

This application is the U.S. National Phase application under 35 U.S.C. § 371 of International Application No. PCT/EP2016/064140, filed on Jun. 20, 2016, which claims the benefit of International Application No. 15174262.4 filed on Jun. 29, 2015. These applications are hereby incorporated by reference herein.

FIELD OF THE INVENTION

The present invention relates to the field of cooking appliances, in particular to an apparatus for preparing food comprising an air cooling system.

BACKGROUND OF THE INVENTION

Air-based fryers are known for cooking food, for example fries or chicken, wherein the heat for preparing the food is provided by hot air. To heat the food for the preparation and cooking purpose, a stream of hot air, or flow of hot air, is generated to circulate around the food placed in a food preparation chamber.

For user comfort and safety, such appliances are generally equipped with an air cooling system that generates cool air outside and around the food preparation chamber in order to keep the external side of the apparatus below a certain temperature. Such air cooling systems generally require sufficient space between the food preparation chamber and the external side of the apparatus to ensure that the flow rate of cool air outside the food preparation chamber is large enough to effectively cool the exterior of the apparatus. However, this means that the size of the apparatus is relatively large, which may create some difficulties, for example, to store it.

SUMMARY OF THE INVENTION

It is an object of the invention to provide an apparatus for preparing food which substantially alleviates or overcomes one or more of the problems mentioned above.

The invention is defined by the independent claims. The dependent claims define advantageous embodiments.

According to the present invention, there is provided an apparatus for preparing food comprising a housing and a food preparation chamber arranged in the housing and having an outer wall. The apparatus further comprises an air cooling system comprising: a fan; a first air inlet arranged at an upper part of the housing; a second air inlet arranged at a lower part of the housing; an air outlet; a first air channel formed between the housing and the outer wall for fluidly connecting the first air inlet and the fan; a second air channel formed between the housing and the outer wall for fluidly connecting the second air inlet and the fan; and, a third air channel for fluidly connecting the fan and the air outlet, wherein the fan is arranged to convey air through the first air channel between the first air inlet and the fan, to convey air through the second air channel between the second air inlet and the fan, and to convey air through the third air channel between the fan and the air outlet, wherein the third air channel is arranged such that air passing through the third air channel is directed onto the outer wall of the food preparation chamber before being vented from the air outlet.

The fan is operated to draw ambient air through the first and second air inlets and into the housing. The air then passes through the housing to cool the housing and the outer wall of the food preparation chamber before being vented through the air outlet.

It is advantageous to reduce the distance between the housing and the outer wall of the food preparation chamber so that the size of the apparatus is reduced. However, this reduces the cross-sectional area of the second air channel. Reducing the cross-sectional area of the second air channel means that the flow rate of the air passing through the second air channel is also reduced, thereby decreasing the rate of heat transfer between the air in the second air channel and the housing and outer wall of the food preparation chamber such that the temperature thereof is increased. However, air also enters the housing via the first air inlet and flows through the first air channel to provide additional cooling of the housing and the outer wall of the food preparation chamber to compensate for the reduced flow rate of air flowing through the second air channel. Therefore, the size of the apparatus can be reduced whilst maintaining an effective cooling of the housing and the outer wall of the food preparation chamber.

The air in the third air channel is directed onto the outer wall of the food preparation chamber to further cool the outer wall such that the temperature of the outer wall, and thus the housing, is further reduced. Therefore, the arrangement of the third air channel reduces the temperature of the housing for a given air flow rate provided by the fan, thereby increasing the efficiency of the cooling process and allowing for the apparatus to be made smaller.

Preferably, the air outlet is arranged on the housing between the upper part and the lower part of the housing. Thus, air drawn through the first air inlet must travel downwardly, via the first air channel, to reach the air outlet and air drawn through the second air inlet must travel upwardly, via the second air channel, to reach the air outlet.

Advantageously, the outer wall of the food preparation chamber may include a top wall of the food preparation chamber, and air in the third air channel is directed onto the top wall. Due to natural convection, which means that heat rises, the top wall will often be the hottest part of the outer wall of the food preparation chamber and so directing the air in the third air channel onto the top wall facilitates effective cooling of the outer wall.

Preferably, the housing includes a side wall and the outer wall of the food preparation chamber includes a side wall of the food preparation chamber, wherein the second air channel is formed between the side wall of the housing and the side wall of the food preparation chamber. Therefore, the temperature of the side wall of the housing is decreased by the cooling air flow in the second air channel. Furthermore, the flow rate of air in the second air channel may be increased by natural convection which urges air in the second air channel to flow upwardly towards the fan as it is heated.

Advantageously, the apparatus may further comprise a reflective heat shield that is configured to reflect heat towards the food preparation chamber. Therefore, less heat is transferred from the food preparation chamber to the housing and so the temperature of the housing is reduced. Furthermore, heat is reflected back into the food preparation chamber to increase the temperature of the food preparation chamber such that less energy is required to heat food in the food preparation chamber. The reflective heat shield may be located at the side wall of the food preparation chamber. Thus, less heat is transferred to the side wall of the housing and so the temperature of the side wall of the housing is reduced for a given flow rate of air flowing through the second air channel, meaning that the cross-sectional area of the second air channel can be reduced.

Preferably, the apparatus comprises a motor that is configured to drive the fan, wherein the motor is arranged such that air flowing in at least one of the first and second air channels cools the motor. The air in the first and/or second air channels may pass over a surface of the motor. This prevents the motor from overheating. In one embodiment, the motor is arranged such that air flowing in the first air channel cools the motor. The motor may be located above the food preparation chamber.

Advantageously, the apparatus may further comprise a food preparation fan for circulating air in the food preparation chamber, wherein the motor is configured to drive the food preparation fan. Therefore, only one motor is required to circulate hot air in the food preparation chamber and to convey cooling air through the housing, thereby increasing the energy efficiency of the apparatus and reducing the number of parts of the apparatus.

Preferably, the apparatus further comprises an electronic circuit for controlling operation of the apparatus and is arranged such that air flowing in at least one of the first and second air channels cools the electronic circuit. The air in the first and/or second air channels may pass over a surface of the circuit. The electronic circuit may be configured to control operation of the motor or fan to control the flow of cooling air in the housing. In one embodiment, the electronic circuit is arranged such that air flowing in the first air channel cools the electronic circuit.

Advantageously, the first and second air channels may converge between the first and second air inlets and the fan. Therefore, air from the first air channel mixes with the air from the second air channel before reaching the fan.

Preferably, the apparatus comprises an internal wall that is disposed between the second air channel and the third air channel. The internal wall may be configured to increase the distance that the air must flow through the housing from the second air inlet to the air outlet such that more heat is transferred to the air from the housing and the outer wall of the food preparation chamber and therefore the temperature of the housing and outer wall is reduced.

Advantageously, the first air inlet may comprise a gap between a side wall and a top wall of the housing. In alternative embodiments, the first air inlet is in the form of an aperture in the side wall or the top wall of the housing.

Advantageously, the second air inlet may extend through at least one of a side wall and a bottom wall of the housing. In one such embodiment, the second air inlet comprises an aperture in the bottom wall of the housing.

Preferably, the air outlet extends through a rear wall of the housing. Thus, hot air exiting the air outlet is not vented towards the front of the apparatus where a user is most likely to be positioned when the apparatus is in use.

In one embodiment, the apparatus is an air-based fryer.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
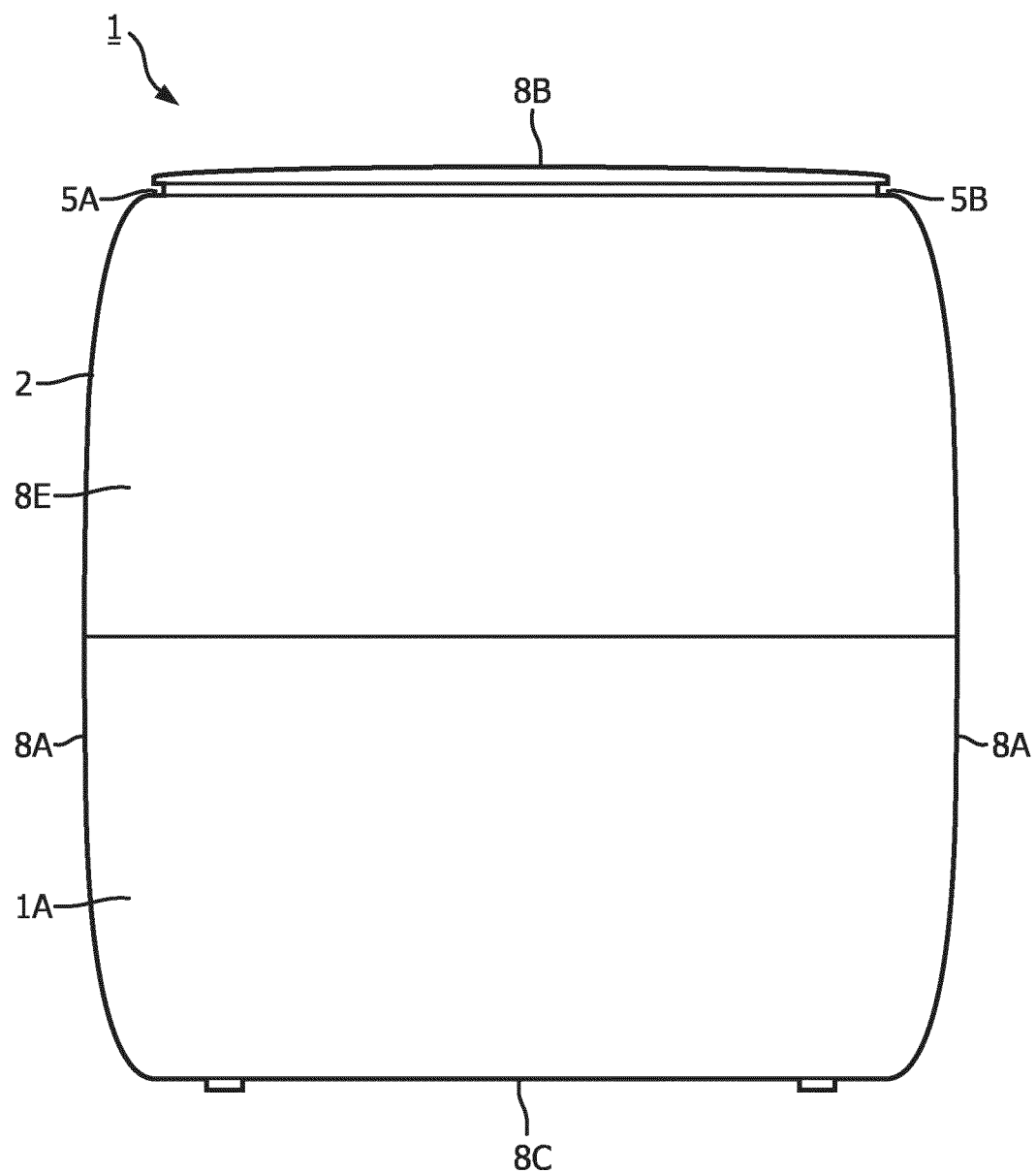
FIG. 1 is a schematic front view of an apparatus for preparing food according to an embodiment of the invention.
Figure 2:
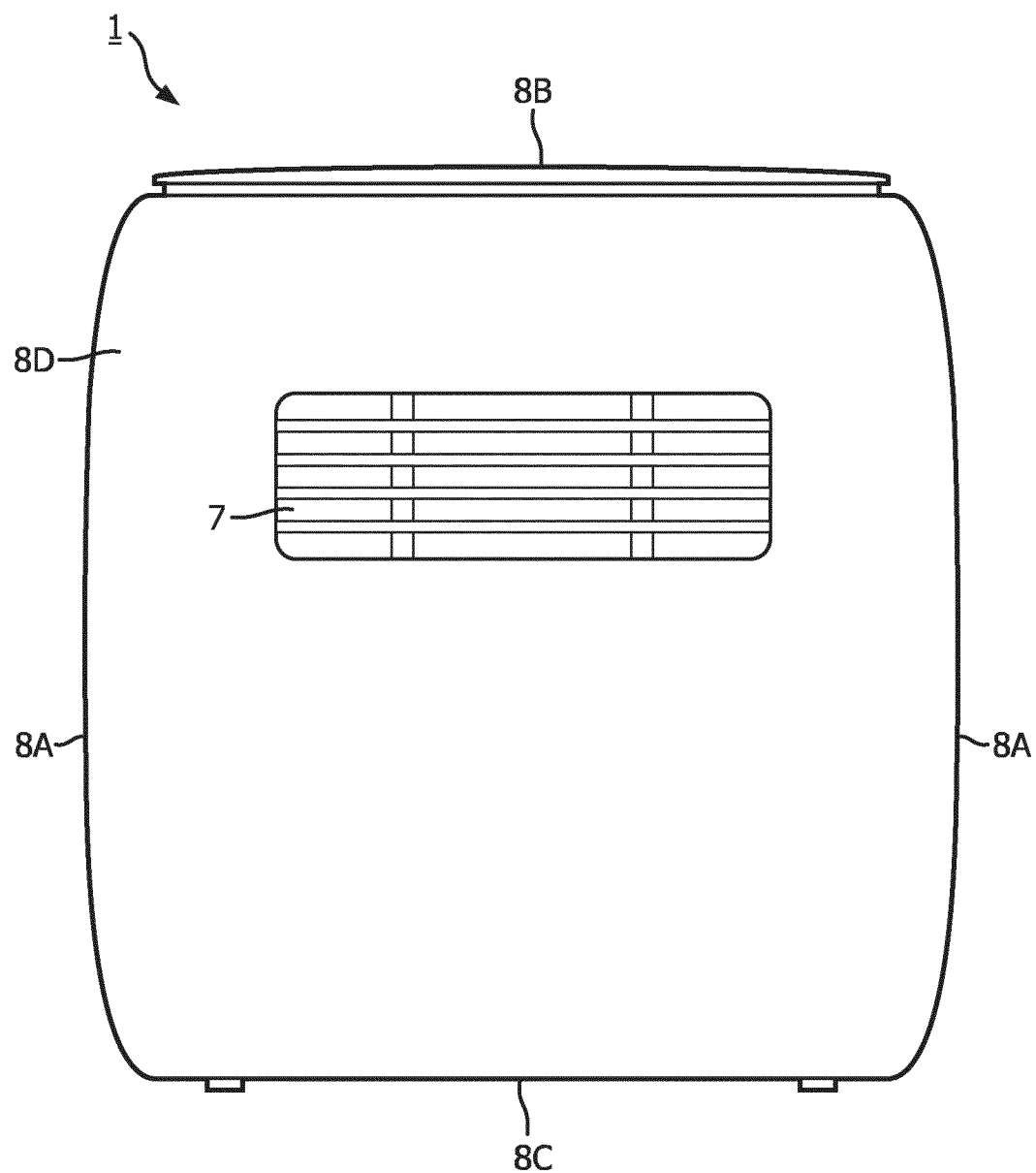
FIG. 2 is a schematic rear view of the apparatus of FIG. 1.
Figure 3:
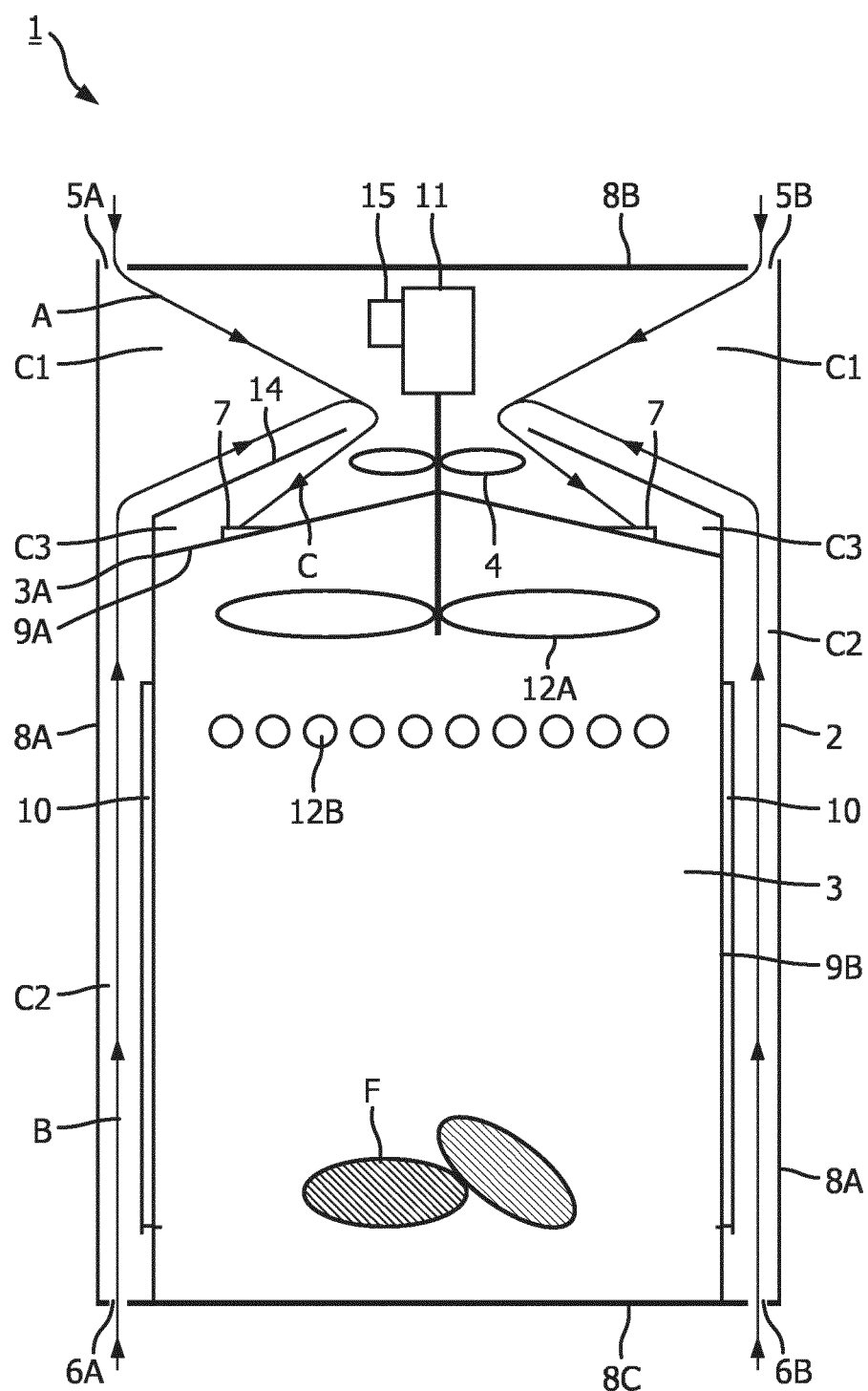
FIG. 3 is a schematic cross-sectional front view of the apparatus of FIG. 1.

Referring now to FIGS. 1 to 3, an apparatus 1 for preparing food according to an embodiment of the invention is shown. The apparatus 1 is in the form of an air-based fryer 1. However, it should be recognised that the apparatus 1 may be an alternative type of home appliance, for example, an alternative type of kitchen appliance, such as an oven.

The apparatus 1 comprises a housing 2 and a food preparation chamber 3 which is arranged in the housing 2 and has an outer wall 3A. The apparatus 1 further comprises an air cooling system comprising:
  a fan 4,
  a first air inlet arranged at an upper part of the housing 2 (for example a pair of first air inlets 5A, 5B is arranged);
  a second air inlet arranged at a lower part of the housing 2 (for example a pair of second air inlets 6A, 6B is arranged);
  an air outlet 7;
  a first air channel C1 formed between the housing 2 and the outer wall 3A for fluidly connecting the first air inlet 5A, 5B and the fan 4;
  a second air channel C2 formed between the housing 2 and the outer wall 3A for fluidly connecting the second air inlet 6A, 6B and the fan (4); and,
  a third air channel (C3) for fluidly connecting the fan (4) and the air outlet (7).

The fan 4 is arranged to convey air through the first air channel C1 between the first air inlet 5A, 5B and the fan 4, to convey air through the second air channel C2 between the second air inlet 6A, 6B and the fan 4, and to convey air through the third air channel C3 between the fan 4 and the air outlet 7, wherein the third air channel C3 is arranged such that air passing through the third air channel C3 is directed onto the outer wall 3A of the food preparation chamber 3 before being vented from the air outlet 7.

For example, in particular if the geometry of the apparatus is symmetrical, a pair of first air channels C1, a pair of second air channels C2 and a third air channel C3 are arranged in the housing 2.

The first air channel(s) C1 each fluidly connect a respective first air inlet 5A, 5B with the fan 4. The first air channel(s) C1 are located between the housing 2 and the outer wall 3A of the food preparation chamber 3.

The second air channel(s) C2 each fluidly connect a respective second air inlet 6A, 6B with the fan 4. The second air channel(s) C2 are located between the housing 2 and the outer wall 3A of the food preparation chamber 3.

The third air channel C3 fluidly connects the fan 4 with the air outlet 7. The third air channel C3 is arranged such that air passing through the third air channel C3 is directed onto the outer wall 3A of the food preparation chamber 3 before being vented from the air outlet 7.

The fan 4 is arranged to convey air through the first air channels C1 between the corresponding first air inlets 5A, 5B and the fan 4. Similarly, the fan 4 is arranged to convey air through the second air channels C2 between the corresponding second air inlets 6A, 6B and the fan 4. The path of the air in the first and second air channels C1, C2 is shown by arrows 'A' and 'B' respectively in FIG. 3.

The fan 4 is arranged to convey air through the third air channel C3 between the fan 4 and the air outlet 7. The path of the air in the third air channel C3 is shown by arrow 'C' in FIG. 3.

In use, the fan 4 draws atmospheric (i.e. ambient) air through the first air inlets 5A, 5B in the upper part of the housing 2 and conveys the air through the respective first air channels C1 to reach the fan 4. Additionally, the fan 4 draws atmospheric air through the second air inlets 6A, 6B in the lower part of the housing 2 and conveys the air through the second air channels C2 to reach the fan 4. The air in the first and second air channels C1, C2 cools the housing 2 as it flows towards the fan 4. Furthermore, the air in the housing 2 cools the outer wall 3A of the food preparation chamber 3 as it flows towards the fan 4 and therefore reduces the amount of heat that is transferred to the housing 2 such that the temperature of the housing 2 is further reduced.

The temperature of the air in the first and second air channels C1, C2 increases as it passes through the housing 2. When the air is warmer, the rate of heat transfer to the air from the housing 2 and outer wall 3A of the food preparation chamber 3 is reduced such that the rate of cooling thereof is reduced. Thus, the cooling effect provided by the air flow in the first and second air channels C1, C2 is greater towards the first and second air inlets 5A, 5B, 6A, 6B, wherein the air is close to atmospheric temperature, than towards the fan 4, wherein the air has been heated. It is therefore advantageous that the apparatus 1 comprises first and second air channels C1, C2 such that cool air enters the housing 2 at the upper part of the housing 2, via the first air inlets 5A, 5B, and at the lower part of the housing 2, via the second air inlets 6A, 6B, to facilitate a more even cooling of the housing 2 and outer wall 3A of the food preparation chamber 3.

The air entering the housing 2 via the second air inlets 6A, 6B will be urged upwardly as it is heated due to natural convection.

To minimise the size of the apparatus 1, it is advantageous to reduce the distance between the housing 2 and the outer wall 3A of the food preparation chamber 3, which requires that the cross-sectional area of the second air channels C2 is reduced. However, this reduced cross-sectional area means that the flow rate of the air passing through the second air channels C2 is also reduced, which decreases the rate of heat transfer between the air in the second air channels C2 and the housing 2 and outer wall 3A of the food preparation chamber 3 and thus increases the temperature of the housing 2 and the outer wall 3A. However, air entering the housing 2 via the first air inlets 5A, 5B flows through the first air channels C1 to provide additional cooling of the housing 2 and the outer wall 3A to compensate for the reduced flow rate of air passing through the second air channels C2. Therefore, the size of the housing 2 of the apparatus 1 can be reduced whilst maintaining an effective cooling of the housing 2 and the outer wall 3A of the food preparation chamber 3.

The air in the third air channel C3 passes over the outer wall 3A of the food preparation chamber 3 to further cool the outer wall 3A such that the temperature of the outer wall 3A, and thus the housing 2, is further reduced. Therefore, the arrangement of the third air channel C3 reduces the temperature of the housing 2 for a given flow rate provided by the fan 4, thereby increasing the efficiency of the cooling process.

In one embodiment, the apparatus 1 comprises a door 1A that may be opened to enable the user to access the inside of the food preparation chamber 3 to position food F in the food preparation chamber 3. In one embodiment, the door 1A is fixed relative to the food preparation chamber 3 and the door 1A and food preparation chamber 3 are slidable out of the housing 2 to allow access to the food preparation chamber 3. In an alternative embodiment, the door 1A is hingedly coupled to the housing 2 to allow access to the food preparation chamber 3.

The housing 2 may be generally box-shaped having opposing side walls 8A, a top wall 8B, a bottom wall 8C, a rear wall 8D and a front wall 8E.

The air outlet 7 may be arranged on the housing 2 between the upper and lower parts. The air outlet 7 may be located at a rear wall 8D of the housing 2. Thus, warm air in the third air channel C3 will vent through the rear wall 8D of the housing 2 and so will not be directed towards a user positioned in front of the apparatus 1.

In one embodiment, the outer wall 3A of the food preparation chamber 3 includes a top wall 9A and opposing side walls 9B. The food preparation chamber 3 may be generally box-shaped. The third air channel C3 may be arranged such that air in the third air channel C3 is directed onto the top wall 9A to cool the top wall 9A. Due to natural convection, the top wall 9A will often be the hottest part of the outer wall 3A of the food preparation chamber 3 and so directing the air in the third air channel C3 onto the top wall 9A facilitates effective cooling of the outer wall 3A.

The second air channels C2 may each be formed between a side wall 8A of the housing 2 and a proximate side wall 9B of the food preparation chamber 3. The apparatus 1 may comprise a pair of internal walls 14 that are each located between a respective second air channel C2 and the third air channel C3. The internal walls 14 may be configured to increase the distance that the air must flow through the housing 2 from the second air inlets 6A, 6B to the air outlet 7 such that more heat is transferred to the air from the housing 2 and the outer wall 3A of the food preparation chamber 3 and therefore the temperature of the housing 2 and outer wall 3A is reduced.

The apparatus 1 may further comprise a reflective heat shield 10. The reflective heat shield 10 is configured to reflect heat towards the food preparation chamber 3 to reduce the amount of heat that is transferred to the housing 2 and thus to reduce the temperature of the housing 2. The reflective heat shield 10 may be located at a side wall 9B of the food preparation chamber 3. In one embodiment, the apparatus comprises a pair of reflective heat shields 10 which are located at respective side walls 9B of the food preparation chamber 3.

The or each reflective heat shield 10 may comprise a shiny material, for example, a metal panel or metal foil. In one embodiment, the or each reflective heat shield 10 comprises a polished metal panel.

In the embodiment shown in FIGS. 1 to 3, each reflective heat shield 10 is located in a corresponding second air channel C2, between a side wall 8A of the housing 2 and a side wall 9B of the food preparation chamber 3, and is secured to a corresponding side wall 9B of the food preparation chamber 3. In an alternative embodiment, each reflective heat shield 10 is secured to a corresponding side wall 8A of the housing 2. In yet another embodiment, each reflective heat shield 10 is disposed inside the food preparation chamber 3 and is secured to a corresponding side wall 9B of the food preparation chamber 3.

A motor 11 may be provided to drive the fan 4. The motor 11 may be arranged such that air flowing in the first air channels C1 flows past the motor 11 to cool the motor 11. Therefore, atmospheric air that is drawn into the first air inlets 5A, 5B to cool the housing 2 and the outer wall 3A of the food preparation chamber 3 also cools the motor 11 to prevent the motor 11 from overheating. The motor 11 may be an electric motor. In an alternative embodiment, the motor 11 is arranged such that air flowing in the second air channels C2 passes the motor 11 to cool the motor 11.

The apparatus 1 may further comprise a food preparation fan 12A and a heating element 12B. The food preparation fan 12A is configured to circulate air in the food preparation chamber 3 to convey the air over the heating element 12B such that the air in the food preparation chamber 3 is heated. Thus, hot air is passed over food F in the food preparation chamber 3 to heat and cook the food ingredients F. Alternatively (not shown), the preparation chamber 3 comprises a food basket to receive the food ingredients F, the food basket having an air-permeable bottom allowing heated air to circulate upwards in the food basket.

The motor 11 may be configured to also drive the food preparation fan 12A. Therefore, only one motor 11 is required to circulate hot air in the food preparation chamber 3 and to convey cooling air through the housing 2, thereby increasing the energy efficiency of the apparatus 1.

An optional electronic circuit 15 may be provided that controls operation of the motor 11 and/or the heating element 12B. The electronic circuit 15 is arranged such that air flowing in the first air channels C1 passes the electronic circuit 15 to cool the electronic circuit 15. In an alternative embodiment, the electronic circuit 15 is arranged such that air flowing in the second air channels C2 passes the electronic circuit 15 to cool the electronic circuit 15.

In the embodiment shown in FIGS. 1 to 3, the first air channels C1 and the second air channels C2 converge between the first and second air inlets 5A, 5B, 6A, 6B and the fan 4. Thus, air from the first air channels C1 mixes with the air from the second air channels C2 before reaching the fan 4.

In the embodiment shown in FIGS. 1 to 3, the first air inlets 5A, 5B are in the form of a gap between the top wall 8B and the side walls 8A of the housing 2. In alternative embodiments, the first air inlets 5A, 5B are in the form of apertures (not shown) provided in the top wall 8B and/or side walls 8A of the housing 2.

The second air inlets 6A, 6B may be in the form of apertures in the side walls 8A and/or bottom wall 8C of the housing 2. Alternatively, the second air inlets 6A, 6B may be in the form of a gap between the bottom wall 8C and side walls 8A of the housing 2.

Although in the above described embodiment the housing 2 of the apparatus 1 is generally box-shaped, it should be recognised that different shapes of housing 2 are intended to fall within the scope of the invention. For example, housing 2 may instead be cylindrical. Similarly, the food preparation chamber 3 may be other than box-shaped. For example, the food preparation chamber 3 may instead be cylindrical.

Although in the above described embodiment the apparatus 1 comprises a pair of first air inlets 5A, 5B and a pair of second air inlets 6A, 6B, in an alternative embodiment (not shown) the apparatus comprises an alternative number of first air inlets and second air inlets. In one such alternative embodiment, the apparatus comprises one first air inlet and one second air inlet and further comprises one first air channel that fluidly connects the first air inlet to the fan and one second air channel that fluidly connects the second air inlet to the fan. In another embodiment, the apparatus comprises three or more first air inlets and three or more second air inlets. Each first air inlet is fluidly connected to the fan by a corresponding first air channel and each second air inlet is fluidly connected to the fan by a corresponding second air channel. Alternatively, the plurality of first air inlets may be fluidly connected to the fan by a single first air channel and the plurality of second air inlets may be fluidly connected to the fan be a single second air channel.

In the above described embodiment the air outlet 7 extends through the rear wall 8D of the housing 2. However, in alternative embodiments (not shown), the air outlet extends through the front wall, top wall, bottom wall, and/or one or both of the side walls of the housing.

Preferably, the air outlet 7 is arranged at mid height between the top wall 8B and the bottom wall 8C of the apparatus.

In the above described embodiment, the third air channel C3 is arranged such that air flowing through the third air channel C3 from the fan 4 to the air outlet 7 is directed over a portion of the top wall 9A of the food preparation chamber 3. However, it should be recognised that the third air channel C3 may instead be arranged such that the air passes over another part of the outer wall 3A of the food preparation chamber 3. For example, the third air channel C3 may instead, or additionally, be arranged such that air flowing through the third air channel C3 from the fan 4 to the air outlet 7 is directed over at least a portion of the side wall 9B of the food preparation chamber 3.

Although in the above described embodiment the apparatus 1 comprises one air outlet 7, in alternative embodiments (not shown) the apparatus instead comprises a plurality of air outlets. In one such embodiment, the apparatus comprises first and second air outlets. The apparatus may further comprise a pair of third air channels that fluidly connect the fan to the first and second air outlets respectively.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. An apparatus for preparing food comprising a housing and a food preparation chamber arranged in the housing, wherein the food preparation chamber includes an outer wall, the apparatus further comprising an air cooling system that comprises:
   a fan;
   a pair of first air inlets arranged at an upper part of the housing;
   a pair of second air inlets arranged at a lower part of the housing;
   an air outlet arranged at an exterior wall of the housing;
   a pair of first air channels formed within the housing between said housing and said outer wall of the food preparation chamber for fluidly connecting said pair of first air inlets and said fan;
   a pair of second air channels formed between said housing and said outer wall of the food preparation chamber for fluidly connecting said pair of second air inlets and said fan; and a third air channel formed within the housing for fluidly connecting said fan and said air outlet,
wherein a geometry of the pair of first air channels, the pair of second air channels and the third air channel is symmetrical in the housing,
wherein said fan is arranged to convey air through said pair of first air channels between said pair of first air inlets and said fan, to convey air through said pair of second air channels between said pair of second air inlets and said fan, and to convey air through said third air channel between said fan and said air outlet, and
wherein said third air channel is further arranged such that air passing through said third air channel is directed onto a portion of said outer wall of the food preparation chamber before being vented from said air outlet.

2. The apparatus according to claim 1, wherein the air outlet is arranged on the housing between said upper part and said lower part.

3. The apparatus according to claim 1, wherein said outer wall of the food preparation chamber includes a top wall of the food preparation chamber, and wherein air in the third air channel is directed onto a portion of said top wall.

4. The apparatus according to claim 1, wherein the housing includes a side wall and the outer wall of the food preparation chamber includes a side wall of the food preparation chamber, and wherein each channel of the pair of second air channels is formed between said side wall of the housing and said side wall of the food preparation chamber.

5. The apparatus according to claim 1, further comprising a reflective heat shield that is configured to reflect heat towards the food preparation chamber.

6. The apparatus according to claim 5, wherein the reflective heat shield is located at the side wall of the food preparation chamber.

7. The apparatus according to claim 1, further comprising a motor that is configured to drive the fan, wherein the motor is arranged within the housing such that air flowing in at least one of the pairs of first and second air channels cools the motor.

8. The apparatus according to claim 7, further comprising a food preparation fan located within the food preparation chamber for circulating air in the food preparation chamber, wherein the motor is configured to drive the food preparation fan.

9. The apparatus according to claim 1, further comprising an electronic circuit for controlling operation of the apparatus, wherein the electronic circuit is arranged within the housing such that air flowing in at least one of the pairs of first and second air channels cools the electronic circuit.

10. The apparatus according to claim 1, wherein the pairs of first and second air channels converge between respective pairs of the first and second air inlets and the fan.

11. The apparatus according to claim 1, further comprising an internal wall that is disposed within the housing between (i) the pair of second air channels and (ii) the third air channel.

12. The apparatus according to claim 1, wherein each inlet of the pair of first air inlets comprises a respective gap between a side wall and a top wall of the housing.

13. The apparatus according to claim 1, wherein each inlet of the pair of second air inlets extends through at least one of a side wall and a bottom wall of the housing.

14. The apparatus according to claim 1, wherein the air outlet extends through a rear wall of the housing.

15. The apparatus according to claim 1, wherein the apparatus is an air-based fryer.

16. An apparatus for preparing food comprising:
a housing;
a food preparation chamber arranged in the housing, wherein the food preparation chamber includes an outer wall; and
an air cooling system that comprises:
a fan;
a pair of first air inlets arranged at an upper part of the housing;
a pair of second air inlets arranged at a lower part of the housing, wherein each inlet of the pair of second air inlets extends through at least one of a side wall at the lower part of the housing and a bottom wall of the housing;
an air outlet arranged at an exterior wall of the housing;
a pair of first air channels formed within the housing extending between said housing and said outer wall of the food preparation chamber for fluidly connecting said pair of first air inlets and said fan;
a pair of second air channels formed between said housing and said outer wall of the food preparation chamber for fluidly connecting said pair of second air inlets and said fan, wherein the housing includes a side wall and the outer wall of the food preparation chamber includes a side wall of the food preparation chamber, and further wherein each channel of the pair of second air channels is formed between said side wall of the housing and said side wall of the food preparation chamber; and
a third air channel formed within the housing for fluidly connecting said fan and said air outlet,
wherein said fan is arranged to convey air through said pair of first air channels between said pair of first air inlets and said fan, to convey air through said pair of second air channels between said pair of second air inlets and said fan, and to convey air through said third air channel between said fan and said air outlet,
wherein said third air channel is further arranged such that air passing through said third air channel is directed onto a portion of said outer wall of the food preparation chamber before being vented from said air outlet, and
wherein a geometry of the pair of first air channels, the pair of second air channels and the third air channel is symmetrical in the housing.

17. The apparatus according to claim 16, further comprising a reflective heat shield that is configured to reflect heat towards the food preparation chamber, wherein the reflective heat shield is located at the side wall of the food preparation chamber.

18. The apparatus according to claim 16, further comprising a motor that is configured to drive the fan, wherein the motor is arranged within the housing such that air flowing in at least one of the pairs of first and second air channels cools the motor.

19. The apparatus according to claim 18, further comprising a food preparation fan located within the food preparation chamber for circulating air in the food preparation chamber, wherein the motor is configured to drive the food preparation fan.

20. The apparatus according to claim 16, further comprising an internal wall that is disposed within the housing between (i) the pair of second air channels and (ii) the third air channel.

* * * * *